Nov. 4, 1947.                H. L. COOKE                2,430,277
                          PHOTOGRAPHIC MAP
                    Filed June 22, 1942        2 Sheets-Sheet 1

INVENTOR
H.L. COOKE
BY
ATTORNEYS

Nov. 4, 1947.   H. L. COOKE   2,430,277
PHOTOGRAPHIC MAP
Filed June 22, 1942   2 Sheets-Sheet 2
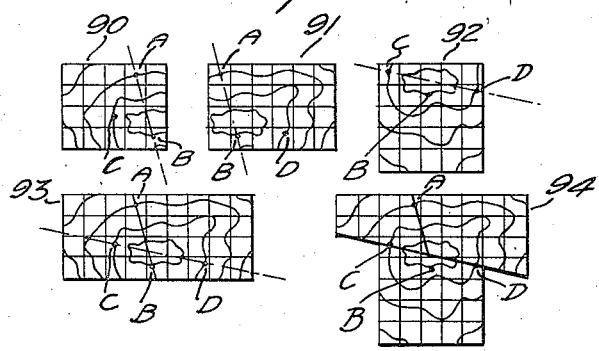
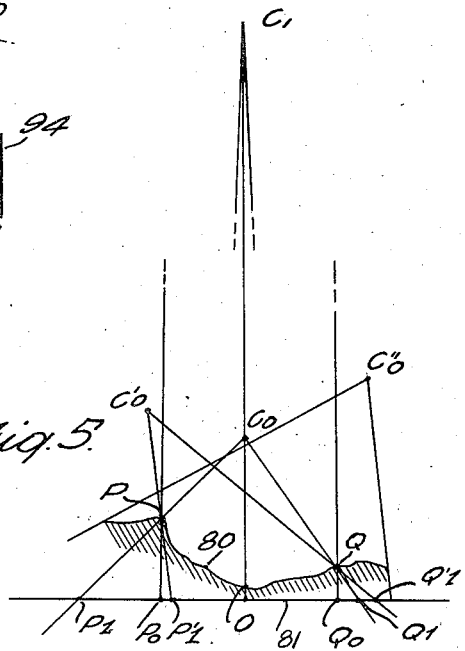
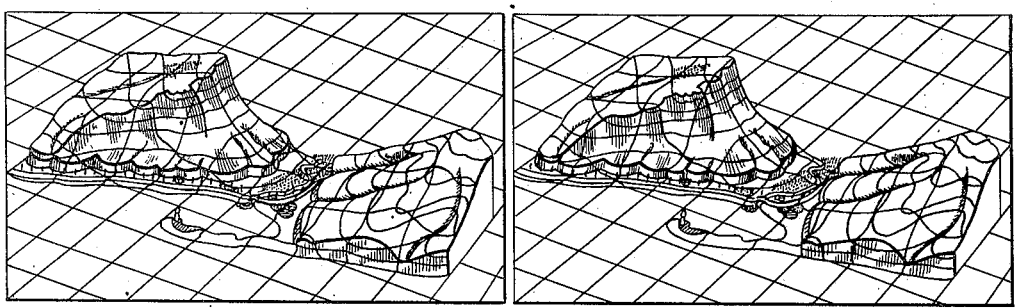
INVENTOR
H.L. COOKE
BY
ATTORNEYS Patented Nov. 4, 1947

2,430,277

UNITED STATES PATENT OFFICE 2,430,277

PHOTOGRAPHIC MAP

Hereward Lester Cooke, Princeton, N. J., assignor to Aero Survey Corporation, a corporation of Delaware Application June 22, 1942, Serial No. 447,897

7 Claims. (Cl. 35—41)

This application is a continuation in part of my pending application, Serial No. 328,175, filed April 6, 1940, for improvements in maps and means and methods for producing maps, now U. S. Patent No. 2,309,752, the common subject matter disclosed in the present application and said Patent No. 2,309,752 comprising the subject matter disclosed in Figs. 1 to 5 of the drawings herein, together with the description thereof.

Maps as produced at present are similar in kind, though superior in accuracy and completeness, to the maps of ancient times. No fundamental improvement in principle has been introduced. Amongst the shortcomings of existing maps may be mentioned the difficulty of locating one's position on the ground by means of even the best topographical maps without the aid of surveying instruments, and the difficulty of forming a mental picture of the visual aspect of terrain represented by such maps. These difficulties are avoided in the type of map herein described.

Attempts have been made to use aerial photographs as maps, or to produce maps by combining such photographs with map indicia such as contour and grid lines and conventional designations of objects and places. Such attempts, however, have failed because aerial photographs as now known are distorted in planimetry due to the fact that they are in general conical projections on a plane of an assemblage of objects which do not lie in a single plane, and are therefore necessarily subject to errors of parallax. Such photographs could not be used as true maps, as the horizontal distances and angular relations between objects depicted are incorrectly represented. It follows that these photographs could not be provided with accurately located grid and contour lines from which the co-ordinates of objects shown in the photograph could be determined. No system of grid and contour lines could be applied to such photographs in correct registration with objects depicted thereon, but there would necessarily be displacement between the true coordinates of objects depicted thereon and the apparent coordinates of such objects indicated by reference to said contour and grid lines. The best drawn grid lines on such photographs would not even be straight.

Attempts have also been made to combine a plurality of aerial photographs of adjacent terrain into a mosaic map, but owing to the distortion in planimetry of each of the individual photographs, it has not been possible to combine or fit the photographs together accurately, and it has been necessary to resort to doctoring or shifting of the photographic details adjacent to the lines of separation of the individual component views in order to make the mosaic present the appearance of continuity. Thus existing mosaics not only have errors in planimetry due to the distortions present in the individual photographs of the mosaic, but further errors have been introduced because of the impossibility of matching the adjacent pictures, each subject to its own individual errors and distortions. Existing mosaics, therefore, are in no true sense maps, and cannot be used as maps because horizontal distances and angular relationships between the objects are not accurately represented.

It is an object of the present invention to provide an aerial photograph which is correct in planimetry, or so nearly correct that no errors are detectable in practical use, so that the photograph can be used directly as a map, and horizontal distances between the objects and their angular relation can be determined by direct measurement within any limits required in actual use.

It is a further object of the invention to provide a map combining such a photograph correct in planimetry with grid and contour lines and other topographical information and map indicia in which substantially all available photographic and topographical information relative to the terrain depicted is shown clearly on a flat surface in true planimetric relation corresponding to that in nature. Such maps will be referred to herein as "phototopes."

It is a further object of the invention to provide mosaic photographs either with or without the addition of grid or contour lines or other topographical data, in which the different elements of the mosaic are correct in planimetry and are combined in true planimetric relation so that the entire mosaic shows the terrain depicted in precise planimetric relation corresponding to that in nature.

It is a further object of the invention to provide a correct photographic representation of the terrain in perspective, prepared from pairs of aerial photographs of the terrain, and representing the terrain as viewed from a position different from that from which the terrain was actually photographed. Such photographic represenations may, if desired, be provided with contour and grid lines shown thereon which are correctly placed in perspective with reference to the perspective positions of all identifiable objects depicted in the photographic representation.

Also such representations may be prepared in stereoscopic pairs.

Aerial photographs correct in planimetry, and maps and mosaics made therefrom, constituting the subject matter of the present invention, are of the greatest utility for military and civil purposes, and provide a means for the study and measurement of terrain more complete and effective than any aerial photographs or maps heretofore known. They enable the exact positions of all identifiable objects shown in the photographs to be determined and the horizontal distances between such objects and their relative angular positions to be ascertained by direct measurement of the photograph or map.

The presence on the photograph or map of photographic representations of visually identifiable objects occupying their correct locations with reference to all other identifiable objects, and with reference to grid and contour lines as provided on the map, is of particular value, as it enables the map user, in the field, to determine his exact location with reference to the identifiable objects in the field, and it enables him to record or communicate his exact location at any time by reference to such objects, and such location can be determined by any other user of the map or copy thereof, at any time. Such references are not obtainable with present aerial photographs, because the positions of such objects are not accurately shown by such photographs, nor can such results be obtained by existing topographical maps because such maps do not show the visually identifiable objects which appear in the photographs. Also by the use of phototopes an observer in an airplane is enabled to read off directly the coordinates of any object in any position seen from the airplane and recognizable on the phototope.

Correct photographic representations of terrain as it would appear from positions different from positions from which the terrain has been or can be photographed are of great value, as they enable the form of terrain to be studied as viewed from various angles. This is especially true if such photographs are in pairs, viewed stereoscopically. The are particularly useful for military purposes, as they make possible the study of terrain from positions corresponding, for instance, with positions behind enemy lines which cannot be readily reached for photographing from airplanes. Such photographs, or stereoscopic pairs, when combined with correctly placed contour and grid lines in perspective are especially valuable, as they enable geographical positions of identifiable objects shown in such photographic representations to be ascertained with reasonable accuracy by reference to such contour and grid lines.

A preferred method of preparing the planimetrically corrected photographs and mosaics, and oblique photographs of the present invention, either with or without contour and grid lines and topographic data, is disclosed in my application aforesaid, Serial No. 328,175. Such method comprises in general the preparation of a correct three dimensional model of the terrain, the projection of a photograph of the terrain on the surface of said model and in exact registry therewith, and the photographing of such model with the photograph projected thereon. When an orthogonal projection or phototope or a planimetrically correct mosaic is desired, the model is photographed in a direction normal to the datum plane of the model in such manner as to eliminate errors due to perspective so that an orthogonal projection is obtained. One method of making such an orthogonal projection is disclosed in my application, Serial No. 328,175 aforesaid, and another method, utilizing a telecentric lens, is disclosed in my application for patent Serial No. 436,747. In the event that a true photographic representation of the terrain is required as viewed from a position different from that from which aerial photographs of the terrain were taken, the model of the terrain having a photograph projected thereon in registry therewith is photographed from a position different from that from which the photograph is projected on the model, as disclosed in my application for patent, Serial No. 328,175. If stereoscopic pairs are desired the model with the photograph projected thereon may be photographed by a stereoscopic camera.

In the accompanying drawings forming a part of this specification:

Figure 3 is a diagram showing how planimetrically corrected mosaics may be prepared from phototopes made in accordance with the present invention.

Figure 5 is a diagram showing the errors which occur in aerial photographs as heretofore produced and absent from the photographic plans or maps of the present invention.

Figure 6 is a view similar to Fig. 4 showing a pair of stereoscopic oblique photographs.

Figure 1:
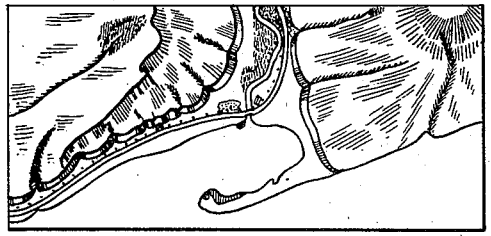
Figure 1 is a diagrammatic plan view which is assumed to represent an aerial photographic representation of terrain correct in planimetry within the limits of observable error, and intended to illustrate the planimetrically correct photograph of the present invention.

Referring to the drawings in detail, Figure 5 shows how distortions occur in aerial photographs.

If $80$ represents a section of terrain photographed from an airplane, $81$ may be taken as the plane upon which the photograph is projected, or upon which it is desired to reproduce the map. If the position of the airplane at the time the photograph was taken is assumed to be $C_0$ and P and Q be taken as two identifiable points on the terrain at different elevations, then it will be seen that the photographic projections of the points P and Q upon the plane $81$ will, owing to the angularity of rays passing from these points to the camera lens, fall at $P_1$ and $Q_1$ respectively. However, the true planimetric positions of the points P and Q as projected vertically down to the plane $81$ will be seen to be $P_0$ and $Q_0$ respectively. Thus the error in planimetry of the showing of point P in the photograph is the distance $P_0$—$P_1$, and the similar error of the point Q is the distance $Q_0$—$Q_1$. Every other point shown in the photograph is likewise subject to errors in planimetry depending upon its elevation above the datum plane $81$, except only in the case of the point O located vertically under the point $C_0$ from which the photograph was taken. If the terrain is photographed from another position, such as $C'_0$, then the errors in planimetry in such photograph of the points P and Q are found to be $P_0$—$P'_1$ and $Q_0$—$Q'_1$, respectively. However, by proceeding in accordance with the method disclosed in my application for patent aforesaid, Serial No. 328,175, an accurate scale model of the terrain is carved, the photograph taken from either of the points $C_0$ or $C'_0$ is projected thereon, and the model with the photograph projected thereon is photographed by rays normal to the plane $81$ or so nearly normal thereto as to be substantially the same in their photographic effect as normal rays. Thus an orthogonal photographic projection is produced in which the photograph of the point P appears at the point $P_0$ and of the point Q appears at the point $Q_0$, and all other points in the photograph are likewise in their correct planimetric relation. This may be accomplished by photographing the model at a great distance, as for instance from the point $C_1$. Such a photograph is illustrated in Figure 1. By taking the photographic projection from a point $C_1$ sufficiently distant from the model, the theoretical planimetric errors of the resulting photograph may readily be reduced to such a degree as to be wholly unobservable, and will completely disappear for purposes of practical measurement, so that the resultant photographic projection for all practical purposes is a true orthogonal photograph of the terrain. By utilizing a suitable long focus or telephoto optical system in taking a photograph of the model from the distant point $C_1$, the resultant orthogonal photograph is of a sufficiently large scale as compared with original aerial photograph as to preserve practically all of the detail of such original photograph. Such a result could not be secured by taking an original aerial photograph at a height sufficient to reduce the planimetric errors to a negligible value even were it possible to reach such a height, because it would be impracticable to take a photograph from an airplane in flight with a lens or telephoto system of sufficiently long focus to produce a photograph showing the terrain on a reasonable scale. Consequently the photographs of the present invention may be said to represent the terrain with the photographic detail obtainable in photographing from a practicable height with the reduction in distortion which would result from photographing the terrain from a very much greater height, approximating infinity. The photograph of the present invention is therefore essentially different from any photograph which could be taken by direct photography from the air.

Other methods for producing an orthogonal photograph may be used, such for instance as by photographing the model through a telecentric lens, as disclosed in my application for patent, Serial No. 436,747. This also results in production of an orthogonal photograph in which the photographic detail is preserved.

An orthogonal photograph of the character described may be used as a map, as all points shown thereon are located in correct planimetry, and direct measurements may be taken of horizontal distances and angular relationships between points. Such a photograph may also desirably be combined with topographical representations, such as contour lines, grid lines, etc., so as to be a combined map and photograph or "phototope." Such a photographic map or phototope is shown in Fig. 2.

Figure 4:
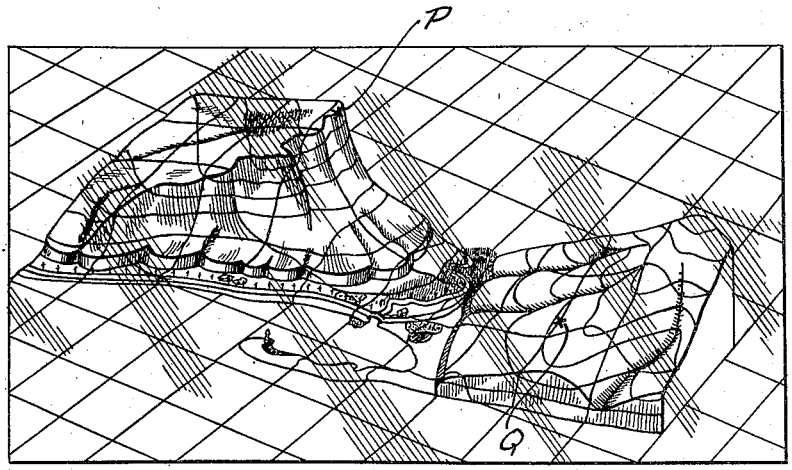
Figure 4 is a photographic representation of terrain, viewed from a position different from that from which the terrain was originally photographed and referred to herein as the "oblique" photograph.

If the model with the photograph projected thereon is photographed from any position other than the positions corresponding with the position $C_0$ and $C'_0$ from which the original airplane photographs were taken, such for instance as the point $C''_0$, then a true photographic representation of the terrain will be produced as viewed from a point corresponding with the point $C''_0$. For convenience this may be referred to as an oblique photograph. If contour lines and grid lines are made to appear on the surface of the model by actually marking such lines on such model, or by projecting the lines on the model as described in my application for patent, Serial No. 328,175 aforesaid, then the oblique photograph will show the appearance of the terrain as viewed from the point $C''_0$, and will also show the contour and grid lines in perspective correctly located thereon, as illustrated in Fig. 4. As the contour lines and grid lines are located properly with respect to the showing of all identifiable objects in the photograph, the positions of all such objects may be determined with reasonable accuracy by reference to the grid and contour lines. Fig. 6 shows a stereoscopic pair of oblique photographs with contour and grid lines thereon.

Figure 2:
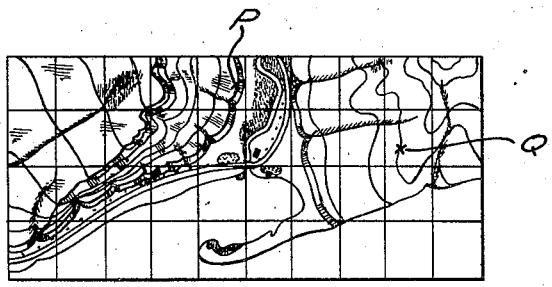
Figure 2 is a similar view of a phototope embodying the present invention and combining topographical data with a planimetrically correct photographic representation as shown in Fig. 1.

The oblique photographic map of the form shown in Fig. 4, and particularly the stereoscopic pair shown in Fig. 6, present a more realistic impression of the character of the terrain than may be obtained from the vertical planimetrically corrected view shown in Fig. 2. Such photograph or pair also permits of the approximate determination of the positions of objects shown by reference to obliquely represented contour and grid lines.

Planimetrically correct photographs or phototopes, as shown in Figs. 1 and 2, may be directly combined to form mosaics which are correct in planimetry throughout. In this respect they possess great advantages over ordinary aerial photographs. Reference to Fig. 5 will show the impossibility of making planimetrically correct mosaics by means of ordinary aerial photographs or in fact of matching any ordinary aerial photographs into an accurate representation of the terrain. For instance, if it is desired to join two photographs taken from airplane positions $C_0$ and $C'_0$ respectively, it will be seen that one of the photographs will show a given point such as P at the position $P_1$, while the other photograph will show the position at the point $P'_1$, neither of which corresponds with the correct position of the point which should be at $P_0$. Thus there is a combination of errors, one set of errors due to the distortion in each photograph resulting from differences in elevation of the terrain, and the other set of errors corresponding to the fact that the two photographs were taken from different positions. Thus there is a double lack of agreement between the pictures and accurate joining is impossible in practice.

As an example it may be assumed that two photographs of undulating terrain are to be joined along a line traversing the undulations. If a horizontal plane midway between the highest elevation and the lowest depression be taken as the most convenient for the projection plane of the mosaic, it will be found that the distortions of the photographs are such that where the line of junction between two photographs passes over terrain lying above the projection plane there will be a strip of terrain not shown on either side of the line of junction, and conversely, where the line of junction passes over terrain lying below the projection a strip of identical terrain will appear on each side of the line of junction. Thus errors of omission and of duplication appear in mosaics formed by piecing together ordinary airplane photographs of undulating terrain. It is thus necessary to doctor the "fake" photographs at the lines of junction so as to produce a complete photographic mosaic which looks like a continuous picture, but which is in fact very inaccurate. This objectionable result is entirely obviated in mosaics produced by joining planimetrically corrected photographs in accordance with the present invention.

An example of the process of forming mosaics is shown in Fig. 3 in which the three planimetrically corrected phototopes or photographs 90, 91 and 92 are to be joined to form a connected mosaic. Objects A, B and C are identifiable on view 90, objects A, B and D on view 91, and objects C and D on view 92. 90, 91 are each cut along straight lines passing through A, B, and joined, forming the two-element mosaic 93. 92, 93 are then each cut along the line connecting C, D and joined, forming the three-element mosaic 94; and the process is continued in this manner until the entire mosaic is completed. The completed mosaic will then have all the characteristics and advantages of a single phototope or photograph of the area shown, all objects and topography being shown in correct planimetric relation, a result not previously accomplished.

I claim:

1. A mosaic photograph of terrain comprising a series of planimetrically correct vertical photographic projections of adjacent sections of the terrain, said photographic projections being matched along adjacent rectilinear edges so as to form a complete mosaic without any spaces or overlaps between adjacent photographs.

2. A mosaic photographic map of terrain comprising a series of planimetrically corrected photographic projections of sections of the terrain, each of said photographic projections having a rectilinear grid thereon, said photographic projections being assembled in registry to form a complete mosaic with the grids on all the photographic projections matching so that there is a continuous rectilinear grid over the whole mosaic.

3. A mosaic photographic map of terrain comprising a series of planimetrically corrected photographic projections of sections of the terrain, said photographic projections having contour lines thereon at the same contour intervals, and being assembled in registry to form a complete mosaic having continuous contour lines extending throughout the same.

4. A stereoscopic pair of photographs of a three dimensional scale model of terrain, which model has appearing upon its surface rectangular grid lines and a projection of an actual photograph of the terrain in registry therewith.

5. A planimetrically accurate representation of terrain photographically reproduced on a plane surface from registering projections of aerial photographs of the terrain taken from different points of observation, said representation having contour and grid lines thereon in substantially correct position with respect to all identifiable objects shown in the representation.

6. A planimetrically corrected photograph of terrain consisting of a photographic representation on a flat surface of a conical projection of an aerial photograph of terrain projected upon and in registry with a scale relief model of said terrain, said corrected photograph being characterized by substantial freedom from the distortion due to parallax of the original airplane photograph.

7. A planimetrically accurate representation of terrain photographically reproduced on a flat surface, said representation having been prepared by taking a photograph by means of substantially parallel light rays of an accurate three dimensional scale model of the terrain having an aerial photograph of the terrain projected thereon in registry therewith.

HEREWARD LESTER COOKE.

REFERENCES CITED

The following references are of record in the file of this patent:

UNITED STATES PATENTS

| Number | Name | Date |
| --- | --- | --- |
| 2,309,627 | Cooke et al. | Feb. 2, 1943 |
| 2,279,446 | Cooke | Apr. 14, 1942 |
| 2,200,203 | Heintz | May 7, 1940 |
| 1,583,125 | Corlett et al. | May 4, 1926 |
| 560,485 | Eiker | May 19, 1896 |

FOREIGN PATENTS

| Number | Country | Date |
| --- | --- | --- |
| 5,435 | Great Britain | 1900 |